(12) United States Patent
Ondracek

(10) Patent No.: US 8,308,222 B2
(45) Date of Patent: Nov. 13, 2012

(54) EXTENDABLE AND RETRACTABLE SPOILER

(76) Inventor: John Ondracek, Denver, CO (US)

(*) Notice: Subject to any disclaimer, the term of this patent is extended or adjusted under 35 U.S.C. 154(b) by 370 days.

(21) Appl. No.: 12/644,651

(22) Filed: Dec. 22, 2009

(65) Prior Publication Data

US 2011/0148143 A1 Jun. 23, 2011

(51) Int. Cl.
*B62D 37/02* (2006.01)

(52) U.S. Cl. .................................. 296/180.1; 296/180.5

(58) Field of Classification Search ............... 296/180.1, 296/180.3, 180.5
See application file for complete search history.

(56) References Cited

U.S. PATENT DOCUMENTS

| | | | |
|---|---|---|---|
| 3,455,594 A | 7/1969 | Hall | |
| 3,791,468 A | 2/1974 | Bryan, Jr. | |
| 4,160,494 A | 7/1979 | McCambridge | |
| 4,379,582 A | 4/1983 | Miwa | |
| 4,433,865 A | 2/1984 | Crompton, Jr. | |
| 4,886,312 A | 12/1989 | Asoh | |
| 4,925,236 A | 5/1990 | Itoh | |
| 5,013,080 A * | 5/1991 | Garrone et al. | 296/180.1 |
| 5,374,098 A | 12/1994 | Nelson | |
| 5,454,619 A | 10/1995 | Haraway, Jr. | |
| 5,908,217 A | 6/1999 | Englar | |
| 6,033,010 A | 3/2000 | Preiss | |
| 6,267,439 B1 | 7/2001 | Aoyama | |
| 6,575,522 B2 * | 6/2003 | Borghi et al. | 296/180.5 |
| 6,742,831 B2 | 6/2004 | Rees | |
| 7,213,870 B1 * | 5/2007 | Williams | 296/180.5 |
| 7,399,026 B2 | 7/2008 | Froeschle | |
| 7,431,382 B2 | 10/2008 | Vlahovic | |
| 7,438,347 B2 | 10/2008 | Froeschle | |
| 7,744,147 B2 * | 6/2010 | Jeong | 296/180.5 |

\* cited by examiner

*Primary Examiner* — Joseph Pape

(74) *Attorney, Agent, or Firm* — Leyendecker & Lemire, LLC; Kurt Leyendecker

(57) ABSTRACT

Described herein are embodiments for extending and retracting an extendable spoiler for assisting a motor vehicle in navigating a turn. According to embodiments, an extendable spoiler has a first and second flaps coupled to first and second outer edges of the spoiler respectively. At least one strut is coupled to an underside of the spoiler and to an extension mechanism that can be used to extend and retract the extendable spoiler when various conditions have been met. A steering detection mechanism is also included and configured to detect left and right turn of the motor vehicle and controls which extendable spoilers are moved from a retracted state to an extended state.

11 Claims, 7 Drawing Sheets

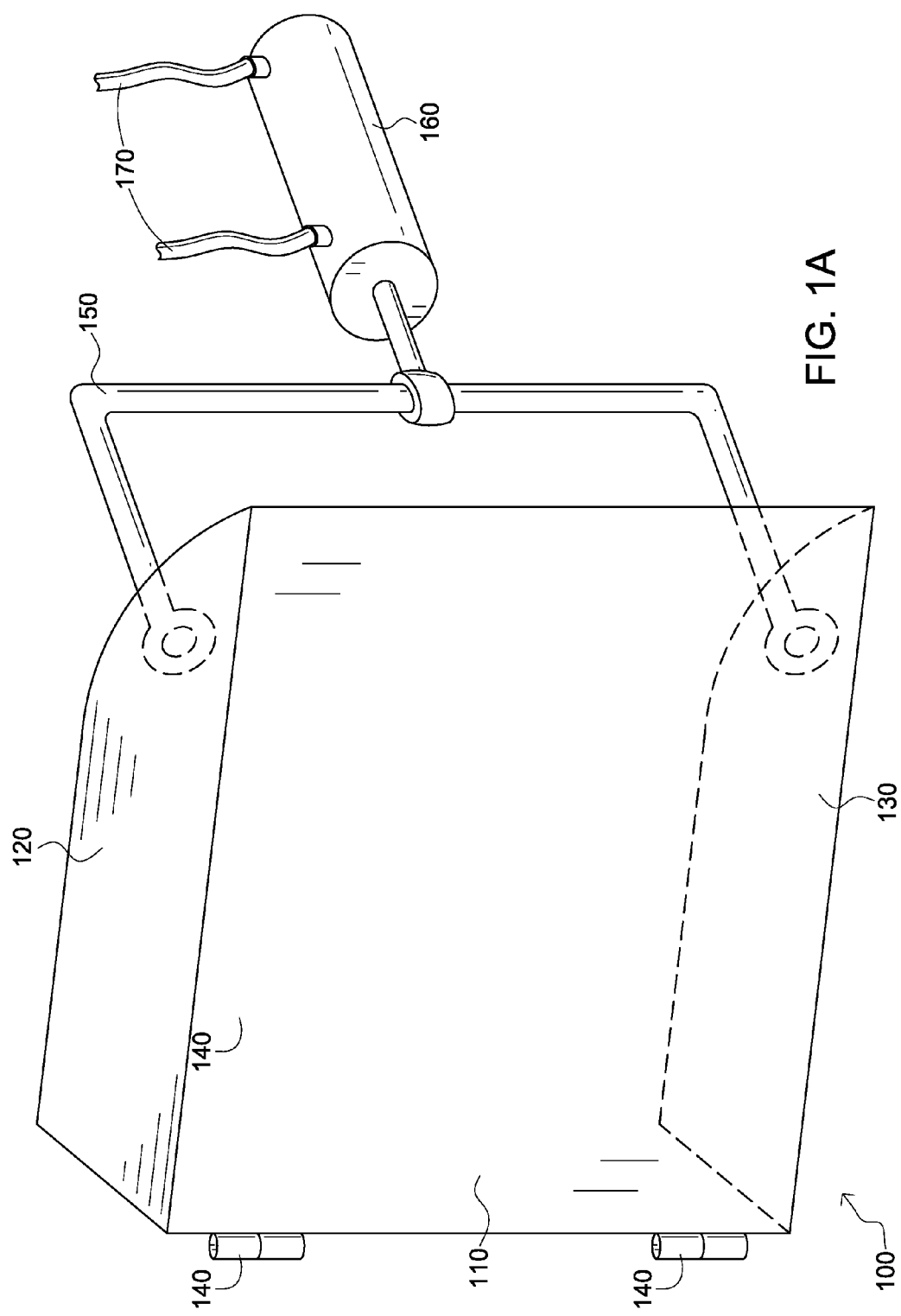

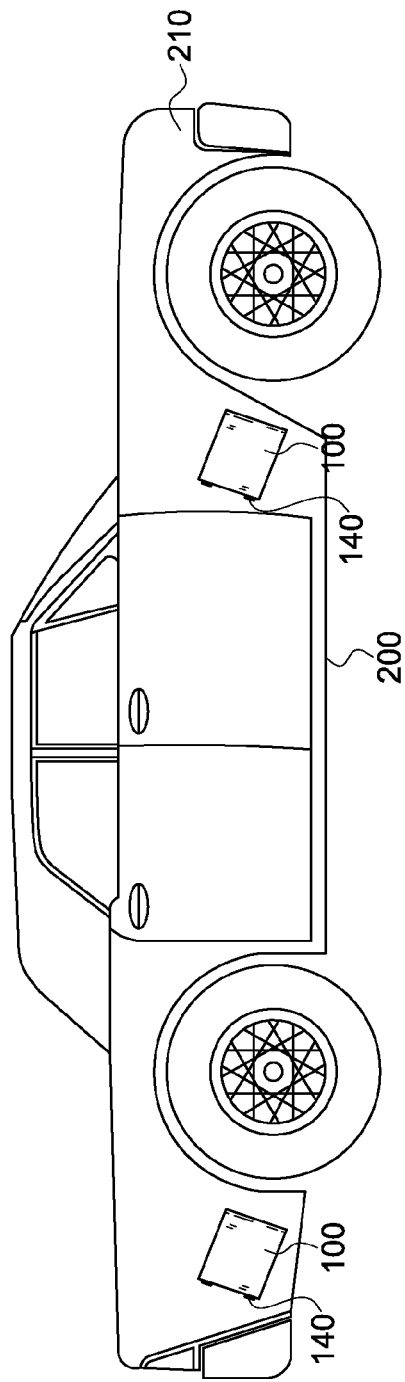
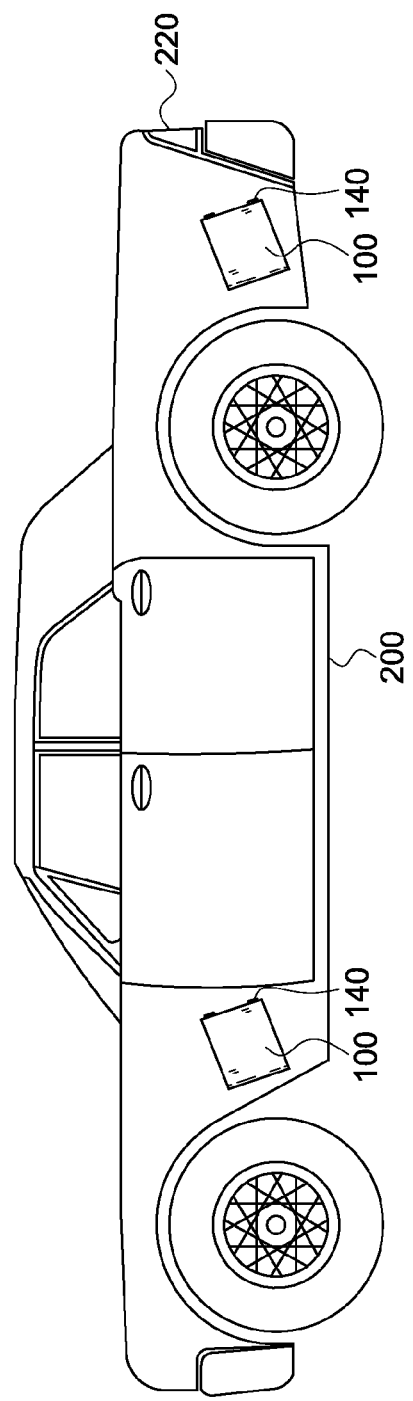
FIG. 2A
FIG. 2B

EXTENDABLE AND RETRACTABLE SPOILER

TECHNICAL FIELD

The invention generally relates to car spoilers.

BACKGROUND

Over the years the use of spoilers on automobiles has become more and more common. Although some spoilers are included simply to enhance the look of a motor vehicle, one purpose of a spoiler is to increase a motor vehicle's grip on the road. Typically, a spoiler acts in the reverse of an airplane wing. Instead of creating a lift, a spoiler creates a downward force on the body of a motor vehicle, which in turn, increases the motor vehicle's grip on the road.

Grip is an important factor when making and navigating turns in a motor vehicle at high speeds. The more grip a motor vehicle has, the higher the speed at which a motor vehicle can successfully navigate a turn.

Although the use of a spoiler can increase the grip of a tire on the road, a spoiler may also decrease performance. When a spoiler generates a downward force, the downward force generates drag which can decrease the motor vehicle's performance.

One alternative to using a spoiler is to increase the weight of the motor vehicle. However, while this alternative may increase the grip, the extra weight adds inertia which the motor vehicle must overcome to make a turn. As a result, the overall performance of the motor vehicle, and its ability to navigate a turn at high speeds, may be diminished.

BRIEF DESCRIPTION OF THE DRAWINGS

Embodiments of the present disclosure may be more readily described by reference to the accompanying drawings in which like numbers refer to like items and in which:

FIG. 1A is an isometric view of the extendable spoiler according to an embodiment.

FIG. 2A is a first side view of a motor vehicle with a plurality of extendable spoilers according to an embodiment.

FIG. 2B is a second side view of the motor vehicle with a plurality of extendable spoilers according to an embodiment.

DETAILED DESCRIPTION

Figure 1B:
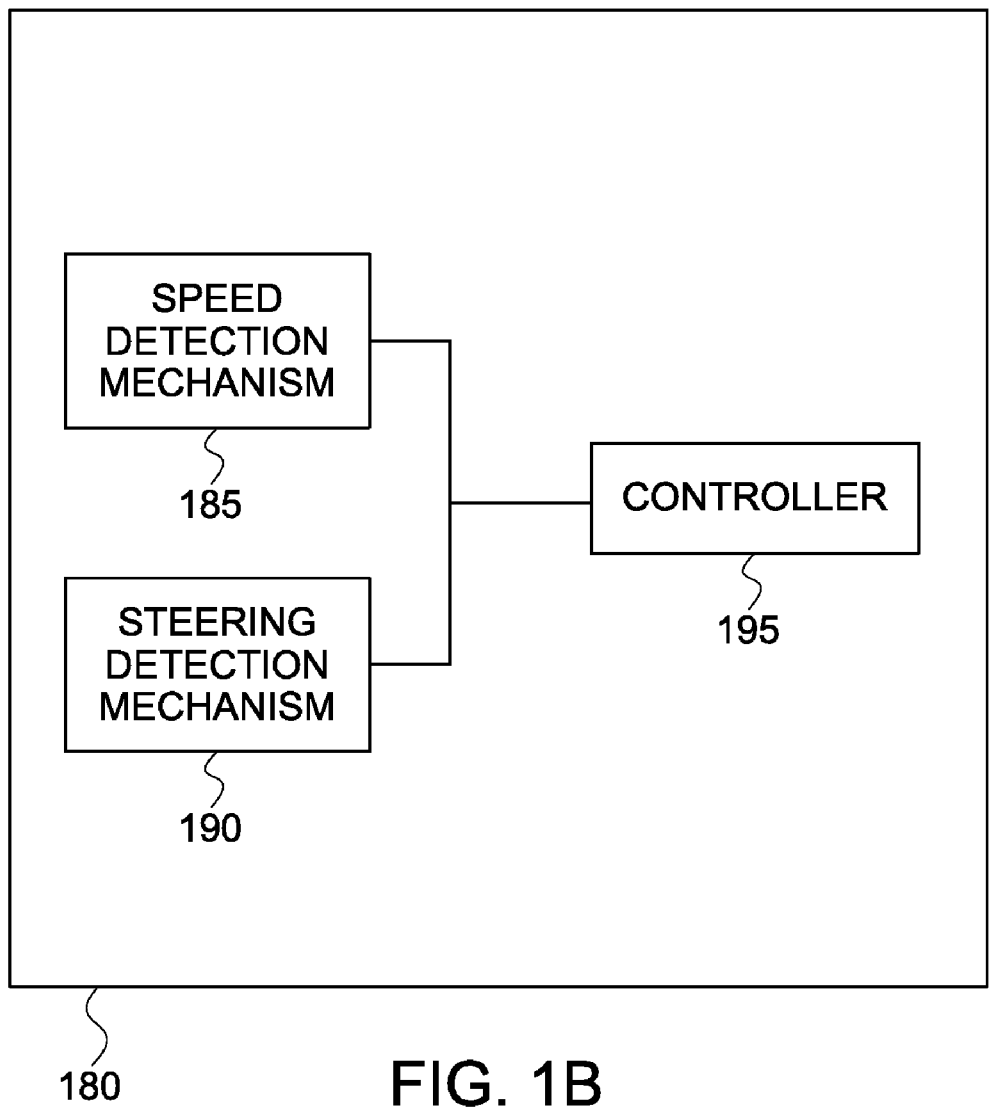
FIG. 1B is a block diagram of a system for controlling the extension and retraction of the extendable spoiler according to an embodiment.

This disclosure will now more fully describe exemplary embodiments with reference to the accompanying drawings, in which specific embodiments are shown. Other aspects may be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements are shown throughout are indicated with like reference numerals.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

As used herein, the term "motor vehicle" means any form of transportation device having a motor and a steering mechanism.

The term "steering mechanism" means any device that can be used to guide the motor vehicle from a first point to a second point.

Described herein are embodiments for an extendable spoiler for use on an outer side of a motor vehicle. In embodiments, the spoiler has first and second flaps that are coupled to outer top and bottom edges of the spoiler. At least one strut is coupled to an underside of the extendable spoiler with a distal end of the strut being coupled to an extension mechanism. The extension mechanism can use a piston and the strut to move the extendable spoiler from a retracted state to an extended state and vice versa. A joint mechanism is coupled to a third outer side of the extendable spoiler and is used to connect the extendable spoiler to an outer side of the motor vehicle. A steering detection mechanism is also included which is configured to detect left and right turns of the motor vehicle.

In another embodiment, a system for extending and retracting a plurality of extendable spoilers is disclosed. According to embodiments, a first extension mechanism is coupled to a first one of the plurality of extendable spoilers and a second extension mechanism is coupled to a second one of the plurality of extendable spoilers. Both spoilers are coupled to a first side and a second side of a motor vehicle respectively. A speed mechanism is also included in the system and used for detecting the speed of the motor vehicle. A turn detection mechanism is used to determine whether the motor vehicle is making either a left or right turn.

In still yet other embodiments a method for extending and retracting a plurality of extendable spoilers coupled to a first and second side of a motor vehicle is disclosed. The method includes detecting a speed of the motor vehicle and determining whether the motor vehicle is turning in a first direction that corresponds to the first side of the motor vehicle or whether the motor vehicle is turning in a second direction that corresponds to the second side of the motor vehicle. When a determination has been made that the motor vehicle is turning the in the first direction and the speed of the motor vehicle is above a predetermined minimum threshold, at least one of the plurality of extendable spoilers coupled on the first side of the motor vehicle that corresponds to the first direction is moved from a retraced state to an extended state. When a determination is made that the motor vehicle is turning in the second direction and the speed of the motor vehicle is above a predetermined minimum threshold, at least one of the plurality of extendable spoilers coupled to the second side of the motor vehicle that corresponds to the second direction is moved from a retracted state to an extended state. When it is determined that the motor vehicle is no longer turning or when the speed of the vehicle drops below the predetermined minimum threshold, the extendable spoiler is moved from the extended state to a retracted state.

FIG. 1A is an isometric view of an extendable spoiler 100 according to an embodiment. The extendable spoiler 100 consists of a spoiler 110, an upper or top flap 120 and a lower or bottom flap 130. As shown in FIG. 1A, the upper flap 120 is coupled to a top outer edge of spoiler 110 while the bottom flap 130 is coupled to a bottom outer edge of the spoiler 110. In embodiments, the surface area of the upper flap 120 and lower flap 130 may be proportional. Alternatively, the surface area of the upper flap 120 may be larger than the surface area of the lower flap 130 or vice versa. It is contemplated that angle, surface area and design of the spoiler 110, and flaps 120 and 130 may be altered and changed as required based on the amount of downward force desired in each specific instance.

In other embodiments, the entire underside of upper flap 120 may be coupled to the top outer portion of the spoiler 110 such that the thickness of spoiler 110 is proportional to the width of the upper flap 120. In such embodiments, the entire surface area of the underside of flap 120 is covered by the spoiler 110. As the spoiler 110 extends downward toward the inner side of the lower flap 130, the spoiler 110 may be tapered so as to cover only a portion the inner lower flap 130 when they are coupled together. Such a configuration can allow more air to pass by both upper and lower flaps.

In embodiments, extendable spoiler 100 can also include hinges 140. According to an embodiment, hinges 140 are coupled to a back outer side of the spoiler 110 and enable the spoiler 110 to be coupled to an outer side (e.g., outside left or outside right) of the body of a motor vehicle. Hinges 140 enable the extendable spoiler 100 to move from a retracted stated to an extended state with relative ease. Although FIG. 1A shows hinges 140 coupled to a back outer edge of the spoiler 110, it is contemplated that the hinges may be coupled to any other portion (e.g., top or bottom outer side) of the spoiler 110 while still enabling the extendable spoiler to move from a retracted to an extended state.

According to yet other embodiments, hinges 140 may be located on an outer surface of the body of the motor vehicle or, in contrast, hinges 140 may be coupled to an inner portion of the body of the motor vehicle so that the hinges do not visually impact the body design of the motor vehicle.

Extendable spoiler 100 also includes one or more struts 150 coupled to an underside of spoiler 110 according to embodiments. Other embodiments provide that the strut 150 may be coupled to the upper flap 120 and the lower flap 130. The distal end of the strut 150 may be connectively coupled with an extension device 160.

According to embodiments extension device 160 is a device that causes the extendable spoiler to move from a retracted state to an extended state. As shown and described above, the distal end of the strut 150 is coupled to the extension device 160. Embodiments provide that the extension device 160 is a hydraulic cylinder and moves the strut in a piston-like fashion. In such embodiments, the hydraulic cylinder can be integrated with a hydraulic system of a motor vehicle and provided with hydraulic fluid through tubes 170.

FIG. 1B is a block diagram of a system 180 for controlling the extension and retraction of the extendable spoiler according to embodiments. In embodiments, extendable spoiler 100 (FIG. 1A) includes a system 180 that controls the extension and retraction of the extendable spoiler 100. The system 180 includes a speed detection mechanism 185, a steering detection mechanism 190, and a controller 195.

In embodiments, the speed detection mechanism 185 and the steering detection mechanism 190 communicate with the controller 195 in determining whether and when to extend and retract the extendable spoiler 100.

According to embodiments, the speed detection mechanism 185 can be used to determine whether the motor vehicle is traveling at speeds above a predetermined minimum threshold (e.g. 40 mph). The speed detection mechanism can be the speedometer of the motor vehicle or configured to interact with a speedometer of the motor vehicle. Embodiments also provide that the speed detection mechanism 185 is an accelerometer. In an alternative embodiment, the speed detection mechanism 185 may be omitted and a user activated switch may be manually turned off and on thereby giving a driver of the motor vehicle an option as to when the retractable spoiler 100 should and should not be extended. In such embodiments, a driver may manually control the extension and retraction of the spoiler thus allowing the extendable spoiler 100 to be extended and retracted at any speed. In still yet other embodiments, the speed detection mechanism 185 and the user activated switch may both be included with the extendable spoiler 100.

Embodiments provide that a steering detection mechanism 190 can also be included with the extendable spoiler 100. The steering detection mechanism 190 detects whether the motor vehicle is turning either left or right. In embodiments, the steering detection mechanism 190 can be communicatively coupled to a steering mechanism (e.g. steering wheel) or steering column of a motor vehicle. Alternatively, the steering detection mechanism 190 may be an accelerometer. In other embodiments, the steering detection mechanism 190 can be communicatively coupled to the speed detection mechanism 185 and/or the controller 195. In embodiments, the steering detection mechanism 190 and the speed detection mechanism 185 may be a single accelerometer that are communicatively coupled to the controller 195. In still yet other embodiments, the steering detection mechanism 190 may be any device capable of sensing or detecting a shift in weight from the center of a motor vehicle to an outer side of the motor vehicle that would indicate the motor vehicle is turning.

According to embodiments, the steering detection mechanism and the speed detection mechanism function together to determine whether and when to extend and retract the extendable spoiler 100. For example, if the speed detection mechanism detects that the motor vehicle is traveling 45 miles per hour and the steering detection mechanism detects that the motor vehicle is beginning to make a right turn, the controller 195 activates the extension mechanism 160 which extends the spoiler on the side of the motor vehicle corresponding to the direction of the turn (e.g., a spoiler on the right side of the motor vehicle is extended when making a right turn). If however, the motor vehicle is traveling at a speed below the predetermined minimum threshold (e.g. 35 miles per hour) and the steering detection mechanism detects either a left or right turn, the controller 195 will not initiate an extension command to the extension mechanism 160.

FIGS. 2A and 2B illustrate first and second sides of a motor vehicle with a plurality of extendable spoilers 100 according to embodiments. FIGS. 2A and 2B show components that were first described with respect to FIG. 1A. Therefore the description of FIGS. 2A and 2B, as well as FIG. 3-FIG. 6 may refer to at least one component described in FIG. 1A. However, any references to components of FIG. 1A are for descriptive purposes only.

Shown in FIG. 2A is a first side 210 of a motor vehicle 200. In embodiments the first side of the motor vehicle 200 may include a plurality of extendable spoilers 100. For example, the first side 210 of the motor vehicle 200 can have an extendable spoiler 100 on a frontal portion of the first side 210 of the motor vehicle 200 and an extendable spoiler 100 on a reward portion of the first side 210 of the motor vehicle 200. Although FIG. 2A shows that the extendable spoilers 100 are placed on certain locations on the frontal and reward portions of the motor vehicle 200, it is contemplated that the spoiler may be placed behind, above, or in front of each of the wheels of the motor vehicle 200. The extendable spoilers 100 on the front portion and rear portion of the motor vehicle include hinges 140 that couple the extendable spoilers 100 to the body of the motor vehicle 200. Hinges 140 may be positioned on the outer body of the motor vehicle 200 or on the inside body of the motor vehicle 200 so as to be hidden from view.

According to embodiments, when the steering detection mechanism detects the motor vehicle 200 is making a turn that corresponds to the first side of the motor vehicle (e.g., a right turn) and the speed detection mechanism detects that the motor vehicle 200 is traveling at a speed greater than a predetermined minimum speed (e.g., 45 mph), the extendable spoilers 100 on both rearward and frontal portions of first side 210 the motor vehicle 200 can be extended.

FIG. 2B illustrates a second side view of a motor vehicle with a plurality of extendable spoilers according to embodiments. As with the first side 210 of the motor vehicle 200, the second side 220 of the motor vehicle 200 contains an extendable spoiler 100 on a rearward portion of the second side 220 of the motor vehicle 200 as well as an extendable spoiler 100 on a frontal portion of the second side 220 of the motor vehicle 200. Although FIG. 2B shows that the extendable spoilers 100 are placed on certain locations on the frontal and reward portions of the motor vehicle 200, it is contemplated that the spoiler may be placed behind, above, or in front of each of the wheels of the motor vehicle 200. Each extendable spoiler 100 may have a plurality of hinges 140 that assist in moving the extendable spoiler 100 from a retracted position to an extended position.

According to embodiments, when the steering detection mechanism detects the motor vehicle 200 is making a turn that corresponds to the second side of the motor vehicle 200 (e.g., a left turn) and the speed detection mechanism detects that the motor vehicle 200 is traveling at a speed greater than a predetermined minimum threshold (e.g., 45 miles per hour) the extendable spoilers 100 on both rearward and frontal portions of the second side 220 motor vehicle 200 can be extended.

Figure 3:
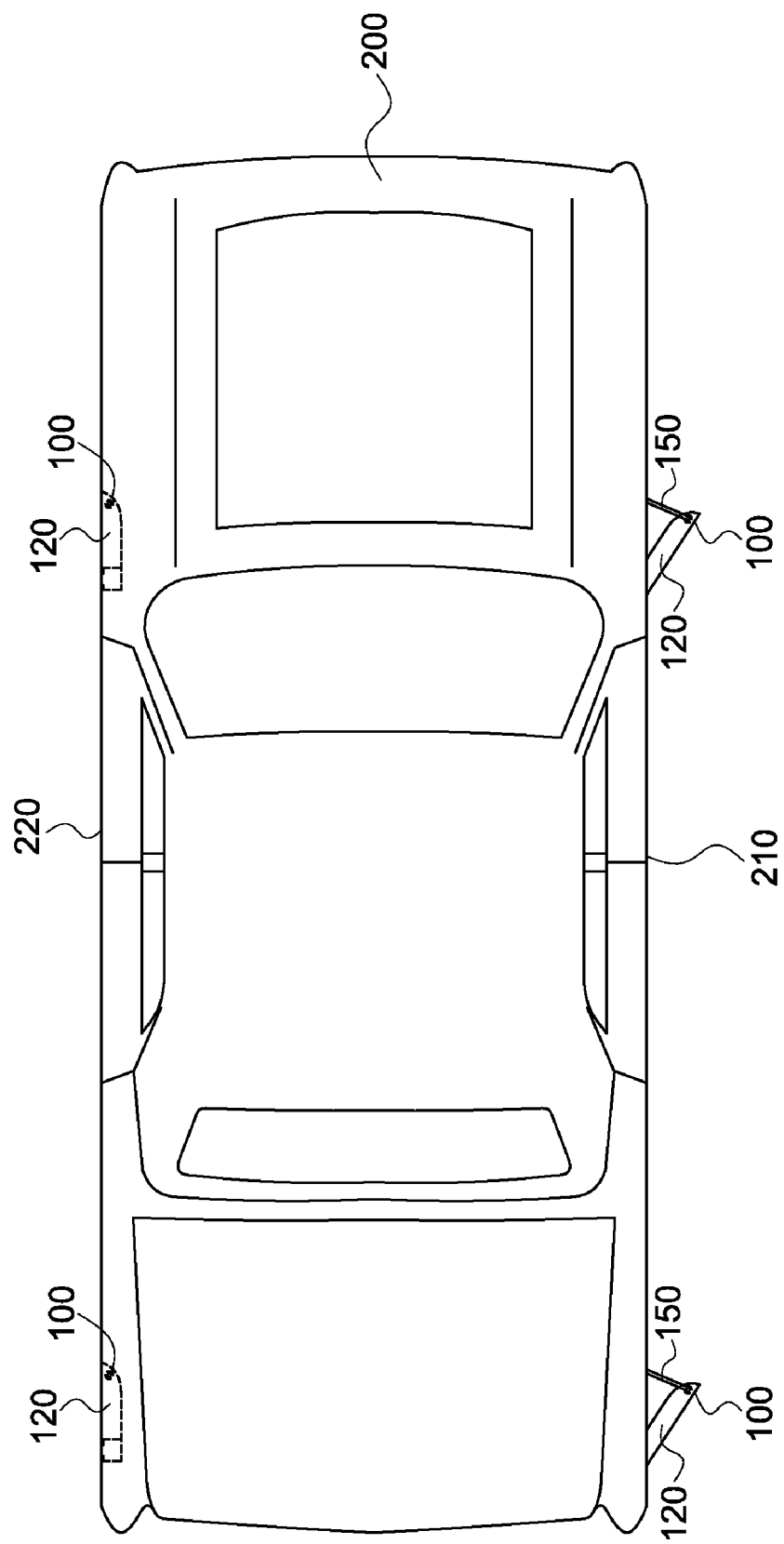
FIG. 3 is a top view of the motor vehicle with a plurality of spoilers on the first side of the motor vehicle in an extended state and a plurality of spoilers on the second side of the motor vehicle in a retracted state according to an embodiment.

FIG. 3 is a top view of a motor vehicle 200 with a plurality of extendable spoilers 100 on the first side 210 of the motor vehicle 200 in an extended state and a plurality of extendable spoilers 100 on the second side 220 of the motor vehicle 200 in a retracted state according to an embodiment. As shown by FIG. 3, when the extendable spoilers 100 are in a retracted state, such as, for example, the extendable spoilers 100 on the second side 220 of the motor vehicle 200, the extendable spoiler 100 sits inside the body of the motor vehicle with an outer portion of the spoiler 110 being flush against the body of the motor vehicle 200. According to such embodiments, the body of the motor vehicle 200 may have a cavity whereby the extendable spoiler 100 may enter when in a retracted state. When in the retracted state the flaps 120 and 130 are contained within the cavity. Thus, the outer body of the of the motor vehicle remains uniform from the front to the back of each side of the motor vehicle 200.

FIG. 3 also shows extendable spoilers 100 being in an extended state on the first side 210 of the motor vehicle 200 according to embodiments. When in an extended state, the extendable spoiler 100 is extended using the combination of the strut 150 and the extension device 160. The extendable spoiler is deployed so that upper flap 120 and the lower flap 130 (not shown) come in contact with the air flowing past the body of the motor vehicle 200. The resistance caused by the passing air coming in contact with the flaps 120 and 130 can enable the motor vehicle 200 to have increased grip on the road as it navigates a turn at a higher speed. Embodiments also provide that when the spoiler is in an extended state such as shown in FIG. 3, air flow can pass through a rearward portion of the spoiler so as to not be trapped between the inner portion of the spoiler 110 and the cavity of the body of the motor vehicle 200 in which the extendable spoiler fits when in a retracted state.

Figure 4:
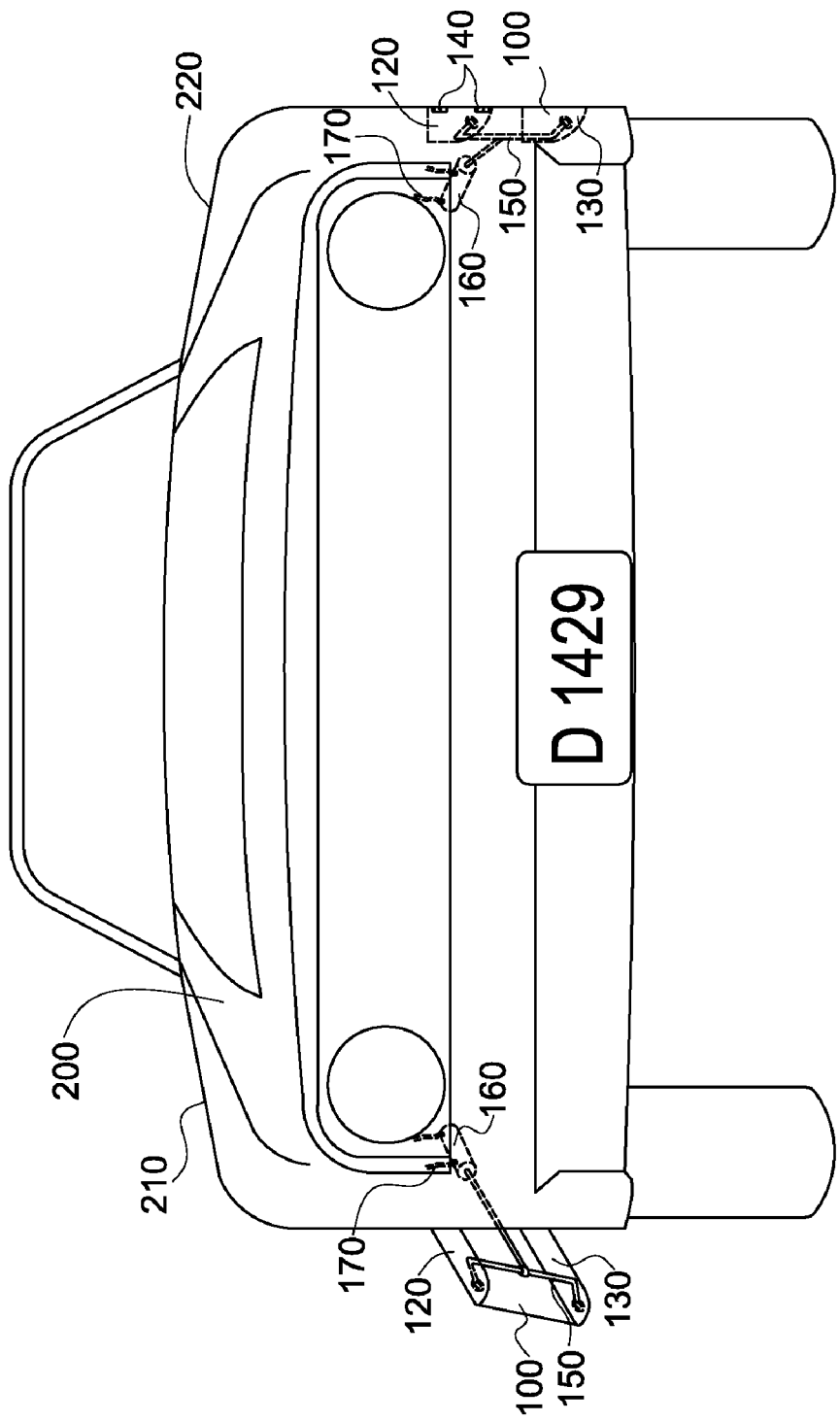
FIG. 4 is a front view of the motor vehicle with an extendable spoiler on the first side of the motor vehicle in an extended state and an extendable spoiler on the second side of the motor vehicle in a retracted state according to an embodiment.

FIG. 4 is a frontal view of a motor vehicle 200 with an extendable spoiler 100 on the first side 210 of the motor vehicle 200 in an extended state and an extendable spoiler 100 on the second side 220 of the motor vehicle 200 in a retracted state according to an embodiment. The deployment of the extendable spoiler 100 shown in FIG. 4 may be the result of the motor vehicle making a right hand turn at a speed of 45 miles per hour.

As shown in FIG. 4, the extendable spoiler 100, when in an extended state, is angled at a position so that the flow of air passing by the motor vehicle 200 comes in contact with a top outer portion of the top flap 120 as well as an inner side of the lower flap 130. As previously mentioned, the spoiler 100 may be designed to allow the air to flow through a reward portion of the extendable spoiler 100.

Further, FIG. 4 shows that when the extendable spoiler 100 is in a retracted state (e.g., the extendable spoiler 100 on the second side 220 of the motor vehicle 200) the extendable spoiler 100 fits snugly into a cavity in the body of the motor vehicle 200. Although FIG. 4, shows hinges 140 on the outer side of the body of the motor vehicle 200, it is contemplated the hinges 140 may be placed inside the body of the motor vehicle 200 so as to be hidden from sight.

According to embodiments, extension device 160 as well as tubes 170 are also contained within the body of the motor vehicle. Embodiments provide that the extension device 160 and tubes 170 can be integrated with other parts of the engine, hydraulics, steering column etc. of the motor vehicle 200.

Figure 5:
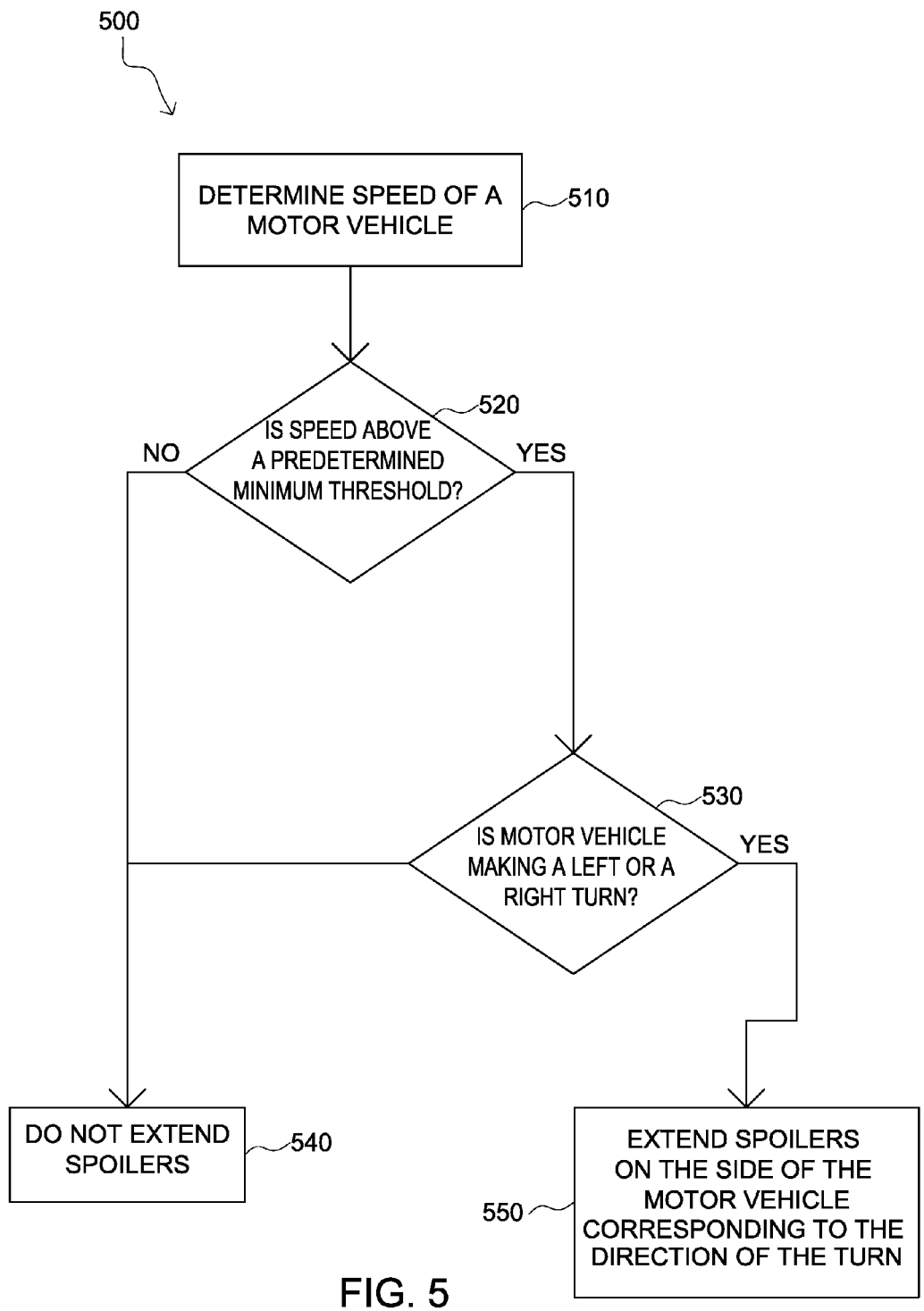
FIG. 5 is a flow chart illustrating a method for moving an extendable spoiler from a retracted state to an extended state according to an embodiment.

FIG. 5 is a flow chart illustrating a method 500 for extending an extendable spoiler when the spoiler is in a retracted state according to an embodiment. Method 500 begins at step 510 in which the speed of the motor vehicle is determined. As stated above, the determination can be made by a speed detection mechanism, speedometer or any combination thereof.

In step 520, a determination is made as to whether the detected speed of the motor vehicle exceeds a predetermined minimum threshold (e.g., 40 miles per hour). According to embodiments, the minimum threshold can be set and changed by a driver of the motor vehicle 200. If a determination is made that the motor vehicle's speed is below the predetermined minimum threshold, flow passes to step 540 and the extendable spoilers are not extended.

If however, it is determined in step 520 that the motor vehicle's speed exceeds the predetermined minimum threshold, flow passes to step 530. In step 530, a determination is made as to whether the vehicle is making a left or right turn. If the determination is made that the vehicle is not making a left or right turn, flow passes to step 540 and the extendable spoilers remain in the retracted state. The method 500 may then be repeated. When it is determined in step 530 that the vehicle is making a left or right turn, flow passes to step 550 and the extendable spoilers on the side of the motor vehicle that corresponds to the turn (e.g. left or right) are extended.

Figure 6:
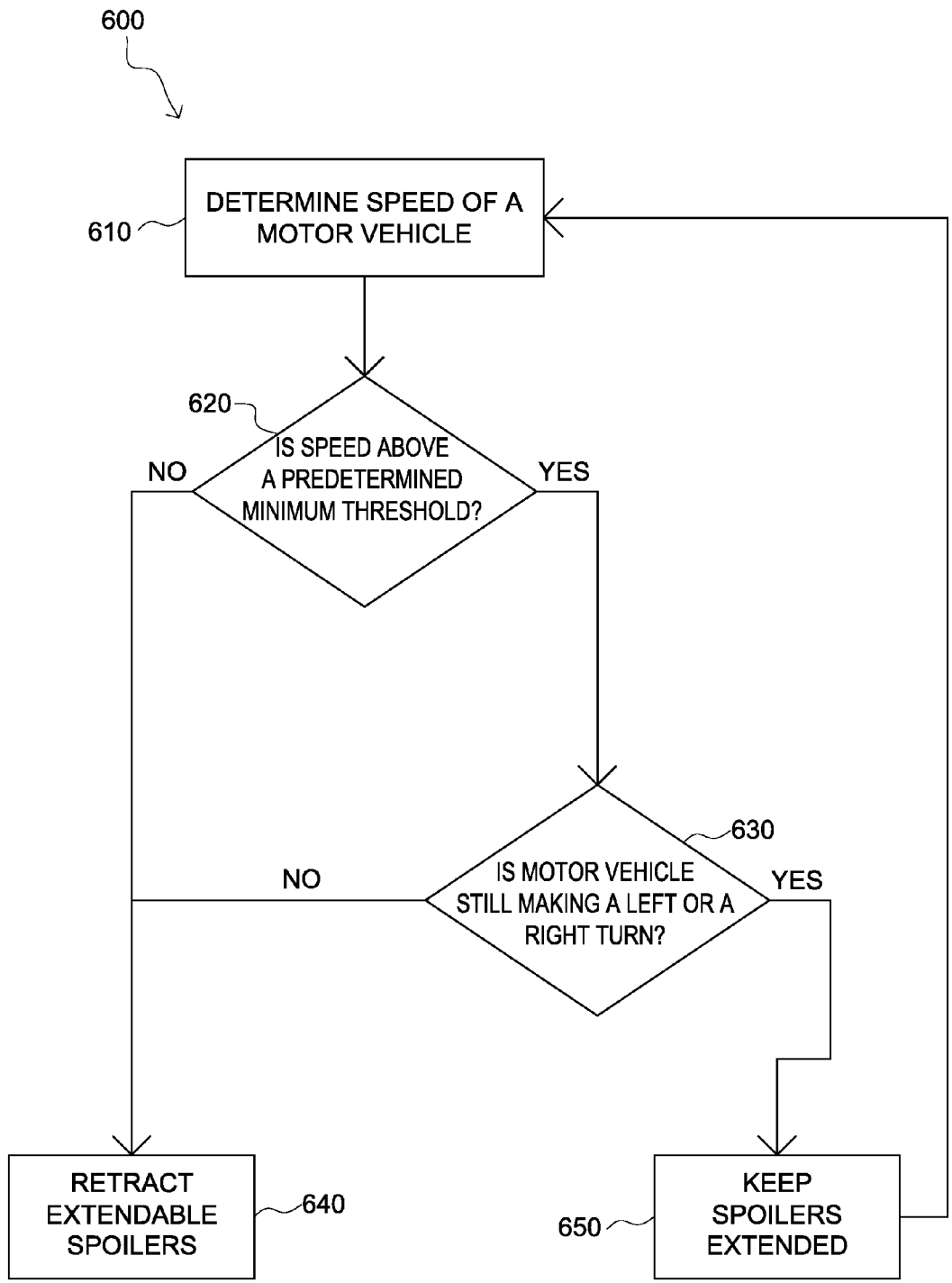
FIG. 6 is a flow chart illustrating a method for moving an extendable spoiler from an extended state to a retracted state according to an embodiment.

FIG. 6 is a flow chart illustrating a method 600 for retracting an extendable spoiler 100 when the spoiler is in an extended state according to an embodiment. Method 600 begins at step 610 in which the speed of the motor vehicle is determined. This determination may be made by a speedometer or other speed detection mechanism or a combination thereof. Once the speed of the motor vehicle has been determined, flow passes to step 620 and a determination is made as to whether the speed of the motor vehicle still exceeds the predetermined minimum threshold speed. If the determination in step 620 is that the speed of the vehicle has fallen below the predetermined minimum threshold (e.g., the speed of the motor vehicle is 38 miles per hour), flow passes to step 640 and the extendable spoilers are moved from an extended state to a retracted state.

If however, the determination is made in step 620 that the speed still exceeds the predetermined minimum threshold speed, flow passes to step 630. In step 630 a determination is made as to whether the vehicle is continuing to make a left or a right turn. If it is determined in step 630 that the motor vehicle is no longer turning, flow passes to step 640 and the extendable spoilers are moved from an extended state to a retracted state. If however, the determination is made in step 630 that the motor vehicle is continuing to navigate either a left or right turn, flow passes to step 650 and the extendable spoilers are kept in the extended state. The method 600 may be repeated until the spoilers are moved to a retracted state.

In alternative embodiments, the steering detection mechanism may be omitted and the extension and retraction of the extendable spoilers may be controlled by use of the steering wheel or steering column of the motor vehicle. In such embodiments, when a driver of the motor vehicle rotates the steering wheel a minimum number of degrees (e.g., 5 degrees) in either a left or right direction, this can be an indicator that the extendable spoilers should be deployed. For example, assuming the motor vehicle was traveling above the predetermined minimum speed, the spoilers would extend and retract once a steering mechanism of the motor vehicle was turned left or right a minimum number of degrees (e.g., 5 degrees). After being extended, the extendable spoiler would move from the extended state to a retracted state when the steering mechanism of the motor vehicle fell below the minimum degree threshold—signaling the motor vehicle was one again traveling in a straight, or semi-straight, direction.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method of extending and retracting a plurality of extendable spoilers coupled to a left side and right side of a motor vehicle, the method comprising;
   detecting a speed of the motor vehicle;
   determining whether the motor vehicle is turning left or right;
   when a detected speed of the motor vehicle is determined to be above a predetermined minimum threshold and when it is determined that the motor vehicle is turning left, extending at least one of the plurality of extendable spoilers coupled to the left side of the motor vehicle; and
   when a detected speed of the motor vehicle is determined to be above a predetermined minimum threshold and when it is determined that the motor vehicle is turning right, extending at least one of the plurality of extendable spoilers coupled to the right side of the motor vehicle.

2. The method of claim 1, further comprising retracting the extendable spoilers when it is determined that either i) the speed of the motor vehicle falls below the predetermined minimum threshold, ii) the motor vehicle is not turning left, or iii) the motor vehicle is not turning right.

3. The method of claim 1, wherein each of the plurality of spoilers has a first flap on a top outer edge of the spoiler and a second flap on a bottom outer edge of the spoiler.

4. The method of claim 1, wherein one or more extension mechanisms are provided, each extension mechanism controlling the extension and retraction of at least one of the plurality extendable spoilers.

5. A vehicle, the vehicle comprising:
   a plurality of wheels;
   a body to which the wheels are operatively coupled, the body having a front side, a back side, a left side and a right side, the left and right sides extending from respective edges of the front and back side;
   a first set of one or more extendable spoilers being movably coupled to the left side;
   a second set of one or more extendable spoilers being movably coupled to the right side;
   extension mechanisms for each spoiler of the first and second set, each extension mechanism being configured to move an associated spoiler between extended and retracted positions;
   a speed detection mechanism adapted to detect a speed of the vehicle;
   a turn detection mechanism adapted to detect the vehicle is turning either left or right; and a controller in operative communication with the extension mechanisms, the speed detection mechanism and the turn detection mechanism;

wherein responsive to a signal from the turn detection mechanism that the vehicle is turning in a first direction and a signal from the speed detection mechanism that the speed of the vehicle has exceeded a predetermined threshold, the controller activates the extension mechanisms associated with one of the first set and second set.

6. The vehicle of claim 5, wherein the controller is configured to activate the associated extension mechanisms to deploy the first set into an extended position when the first direction is left.

7. The vehicle of claim 5, wherein the controller is configured to activate the associated extension mechanisms to deploy the second set into an extended position when the first direction is right.

8. The vehicle of claim 6, wherein the controller is configured to signal the extension mechanisms to retract the first set when the speed of the vehicle drops below the predetermined threshold of the vehicle is no longer turning in the first direction.

9. The vehicle of claim 5, wherein the controller is configured to activate the extension mechanisms associated with either a deployed first set or second set to retract the first set or the second set when the speed of the vehicle drops below the predetermined threshold or the vehicle is no longer turning in the first direction.

10. The vehicle of claim 5 wherein an outside surface of each spoiler of the first set and the second set are flush with the respective left and right sides when the spoilers are in the retracted position.

11. The system of claim 10, wherein each extension mechanism comprises a hydraulic cylinder.

* * * * *